Patented Jan. 13, 1953

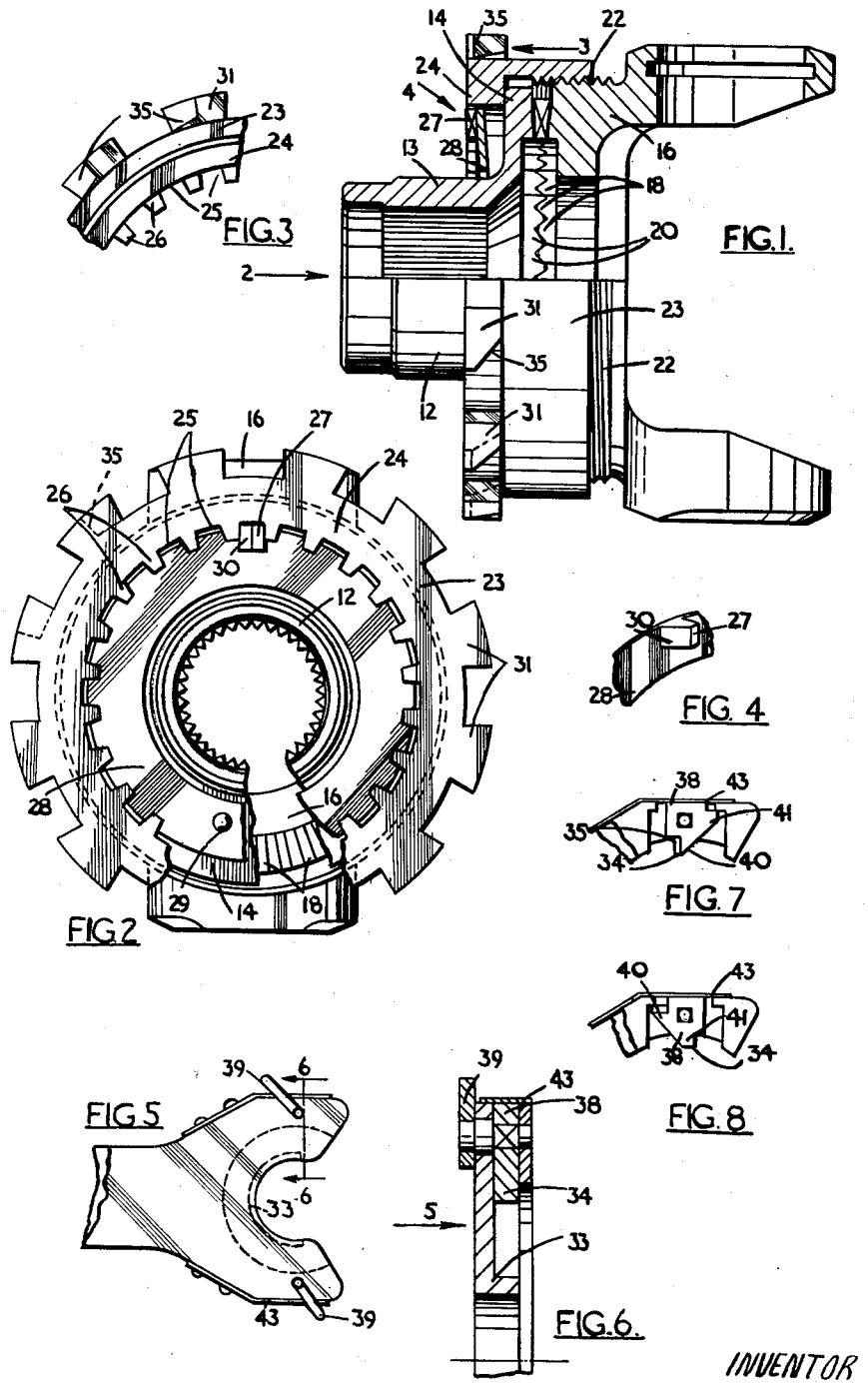

2,625,416

UNITED STATES PATENT OFFICE 2,625,416

MEANS FOR SECURING TOGETHER TWO SHAFTS OR THE LIKE

Leslie Richard Fellows, Coventry, England, assignor to Armstrong Siddeley Motors Limited, Coventry, England Application March 24, 1950, Serial No. 151,675
In Great Britain April 29, 1949

2 Claims. (Cl. 287—107)

In the case of an aero engine, for example, a gas turbine engine, there is usually at least one shaft, for example, for driving "auxiliaries," which has at times to be disconnected from a generally coaxial driving member, and it is very advantageous to save time in effecting its disconnection, or in correctly securing it again in position.

The usual practice is to provide a pair of flanges on the ends of the shaft or like parts which can be secured together by means of, say, four nuts and bolts or studs, and it very often happens that at least one of these nuts is relatively inaccessible, which increases the time involved in separating the parts, or in re-assembling them, and often requires the use of a special spanner.

A method, according to the invention, of securing two coaxial rotatable members together so that they can be quickly detached from one another or accurately secured together, involves providing the adjacent ends of the said members with inter-engaging self-centering teeth to ensure a coaxial relationship between the two, using a nut which has a threaded engagement with one of the members and an axial location engagement with the other, and providing a releasable spring catch for holding the nut against turning.

The invention further consists in a joint comprising two coaxial members having inter-engaging self-centering teeth, a ring nut having a screw-threaded engagement with one of the members and an axially locating flange adapted to bear against the other of the members, the flange of the nut having a ring of notches at its inner periphery, and a spring catch to coact with the flange notches for angularly locating the nut, the catch being a leaf-type spring carrying a detent shaped to click over the teeth between the notches when tightening the nut.

In the accompanying drawings:

Figure 1 is a half-sectional elevation showing two coaxial rotatable members coupled together according to the invention;

Figure 2 is an end elevation, looking in the direction of the arrow 2 of Figure 1, with the nut and the associated member of the joint broken away at the bottom in order to disclose some of the teeth of the other member;

Figure 3 is a fragmentary axial view of the nut, looking from the right—i. e., substantially in the direction of the arrow 3 of Figure 1;

Figure 4 is a fragmentary perspective view of the spring catch, looking in the direction of the arrow 4 of Figure 1;

Figure 5 shows the operative end of a spanner which is specially suitable for use in operating the nut;

Figure 6 is an enlarged sectional elevation taken on the line 6—6 of Figure 5; and Figures 7 and 8 are similar fragmentary views of the top jaw of the spanner, to a slightly larger scale than that of Figure 5, with a part broken away to show an adjustable pawl in the operative position, respectively, for unscrewing (Figure 7) and for tightening (Figure 8) the nut.

In the drawings, one of the members, for example, the driving member, of the joint of the invention, is shown at 12 as comprising a sleeve portion 13 attached to a radial end flange 14, the sleeve portion being internally splined to enable it to have a driving connection with a journalled driving shaft, which is not shown. The driven member 16 of the joint of the invention is shown as a yoke to constitute the driving element of a three-element coupling of a kind well-known per se. As will be well understood, the aforesaid driving shaft, not shown, may be permanently coupled to the driving member 12 of the joint, and may be connected to be driven, for example, from a gas turbine engine; and the driven element (not shown) of the three-element coupling may be permanently coupled to an "auxiliary" drive shaft of the gas turbine engine.

The driving element of the coupling, i. e., the driven member 16, is formed on its appropriate face with a ring of axially-extending sharp-edged teeth 18 disposed along lines radial to the axis of the joint. The teeth taper in axial elevation (Figure 2) from their radially outer edges towards their radially inner edges, according to true radial lines, and in side elevation also (Figure 1) the free edges of the teeth and the bases of the teeth also taper from their radially outer edges to their radially inner edges, the lines converging to meet at the axis of the joint. The flange 14 of the driving member 12 has a corresponding ring of teeth 20, so that when the two toothed rings are pressed axially into full engagement the members 12, 16 are self-centered or rendered coaxial—as in the case of the so-called Hirth coupling.

In the present instance a cylindrical portion of the member 16 has a screw-thread 22 cut upon it, to be engaged by the internal thread of a sleeve nut 23 having a radially-extending flange 24 at its other end to engage behind the flange 14 of the member 12, so that screwing up the nut will force the teeth into self-centering engagement as aforesaid.

The locking means for the nut is shown as including a series of notches 25, between teeth 26 formed at the internal periphery of the flange 24 of the nut, with which coacts a one-way spring catch. This is shown as comprising a detent 27 carried by an annular-type of leaf-spring 28 riveted at 29 to the appropriate face of the flange 14, the detent having an inclined face 30 such as to allow of rotation of the nut in the tightening direction, whilst its straight face (Figure 1), opposite its inclined face, normally prevents reverse rotation of the nut.

For screwing up the nut use may be made of a C-spanner having projections adapted to be entered axially to engage serrations between teeth 31 provided on the external periphery of the nut at the end where the radial flange 24 is. For unscrewing the nut use may be made of a generally similar spanner fitted, at a less radius with regard to the axis of the joint, as shown by Figures 5 and 6, with an axially-extending flange portion 33 which can engage and press back the spring catch when the spanner is engaged in the serrations of the nut, thus holding the nut free to be unscrewed.

To ensure that the spanner will engage the teeth 31 sufficiently to press back the spring catch in this way, the spanner projections 34 and the teeth 31 may be undercut laterally, in a manner known per se, at 35 as indicated. (These undercut portions are shown by chain lines on only two of the teeth 31 in Figure 2.) The arrangement is such that applying torque to the spanner in the direction to unscrew the nut will tend to force the spanner projections axially into full engagement with the serrations between the teeth 31, thereby moving the flange portion 33 of the spanner fully into engagement with the spring catch.

The actual spanner shown is one which is adapted for use either when tightening the nut or unscrewing it. Each of the spanner jaws carries a pawl 38 (Figures 6 to 8) which is movable by means of an arm 39 either into the position shown in Figure 7, in which the undercut projection 40 is in the operative position, to enable the spanner to be used for unscrewing the nut, or to the position shown in Figure 8, in which a straight cut projection 41 is in the operative position, to enable the spanner to be used for tightening the nut. The pawl is biassed to stay in the selected position by means of a leaf-spring 43.

Thus, after using the spanner for unscrewing the nut (Figure 7), in order to screw up the nut the pawls are moved to bring the projections 41 into the operative position (Figure 8), and, on applying torque to the spanner, when the projections 41 are engaged in the serrations of the nut, the spanner will not be forced axially to hold the spring catch clear of the teeth 26 of the nut, and the detent 27 will therefore click over the associated teeth until tightening of the nut has been completed.

What I claim as my invention and desire to secure by Letters Patent of the United States is:

1. A joint comprising two co-axial members having inter-engaging self-centering teeth, a ring nut having a screw-threaded engagement with one of the members and an axially locating flange adapted to bear against the other of the members, the flange of the nut having a ring of notches defining teeth at its inner periphery, a leaf spring anchored to said other of the members, said leaf spring remotely from its anchorage having a portion for resiliently engaging the backs of said teeth and having another portion radially within the inner periphery of said locating flange, and a detent fast with said leaf spring remotely from its said anchorage and for coaction with the flange notches for angularly locating the nut, said detent shaped to click over the teeth between the notches when tightening the nut, and the said another portion of said leaf spring being for axial deflection for withdrawing the detent from the engaged notch when the nut is to be removed.

2. A joint comprising two co-axial members having inter-engaging self-centering teeth, a ring nut having a screw-threaded engagement with one of the members and an axially locating flange adapted to bear against the other of the members, the flange of the nut having a ring of notches defining teeth at its inner periphery, an annular leaf spring fast at one end of a diameter with said other of the members, said leaf spring having a portion at the other end of said diameter for resiliently engaging the backs of said teeth and having another portion radially within the inner periphery of said locating flange, and a detent fast with said leaf spring in a position at the said other end of said diameter and for coaction with the flange notches for angularly locating the nut, said detent shaped to click over the teeth between the notches when tightening the nut, and the said another portion of said leaf spring being for engagement by a tool when the latter is being moved axially into engagement with the nut whereby to become flexed for withdrawing the detent from the engaged notch when the nut is to be removed.

LESLIE RICHARD FELLOWS.

REFERENCES CITED

The following references are of record in the file of this patent:

UNITED STATES PATENTS

| Number | Name | Date |
|---|---|---|
| 349,678 | Applegate | Sept. 28, 1886 |
| 1,435,028 | Stewart | Nov. 7, 1922 |
| 1,722,541 | Rossetti | July 30, 1929 |
| 2,270,092 | Thompson | Jan. 13, 1942 |
| 2,400,166 | Reece | May 14, 1946 |
| 2,489,919 | Merriman | Nov. 29, 1949 |